(12) United States Patent
Miyamoto et al.

(10) Patent No.: US 6,195,316 B1
(45) Date of Patent: Feb. 27, 2001

(54) OPTICAL RECORDING MEDIUM USING LAND/GROOVE RECORDING

(75) Inventors: Harukazu Miyamoto; Hiroyuki Minemura; Hisataka Sugiyama, all of Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/394,870

(22) Filed: Sep. 13, 1999

Related U.S. Application Data

(63) Continuation of application No. 09/184,007, filed on Nov. 2, 1998, now Pat. No. 5,953,310, which is a continuation of application No. 09/059,349, filed on Apr. 14, 1998, now Pat. No. 5,878,008, which is a division of application No. 08/600,730, filed on Feb. 13, 1996, now Pat. No. 5,805,565.

(30) Foreign Application Priority Data

Feb. 14, 1995 (JP) .................................................. 7-024949

(51) Int. Cl.⁷ ....................................................... G11B 7/00
(52) U.S. Cl. ....................................................... 369/44.26
(58) Field of Search ............................. 369/44.26, 44.34, 369/275.3, 275.4, 54, 47, 44.29, 44.35

(56) References Cited

U.S. PATENT DOCUMENTS

| | | |
|---|---|---|
| 4,858,221 | 8/1989 | Romeas . |
| 4,949,331 | 8/1990 | Maeda et al. . |
| 5,383,176 | 1/1995 | Inui et al. . |

(List continued on next page.)

FOREIGN PATENT DOCUMENTS

| | | | |
|---|---|---|---|
| EP 305 979 A2 | 3/1989 | (EP) . |
| 0 588 305 A2 | 3/1994 | (EP) . |
| 49-103515 | 10/1974 | (JP) . |
| 59-17371 | 4/1984 | (JP) . |

(List continued on next page.)

OTHER PUBLICATIONS

"Frequency Domain Characterization of Mass Air Flow Sensors", SAE Paper No. 880561, pp. 111–119.
"Conventional Event Based Engine Control", SAE Paper No. 940377, pp. 145–164.

*Primary Examiner*—Thang V. Tran
(74) *Attorney, Agent, or Firm*—Antonelli, Terry, Stout & Kraus, LLP

(57) ABSTRACT

An optical recording/reproducing method and apparatus for use with an optical recording medium to which grooves and lands are formed on a substrate. Information recording areas are formed in association with both a groove and a land and an address area is formed at the information recording area preceding the groove and the land. VFO and address information are represented by pits which are disposed on an extension of the boundary between said groove and said land. The pits represents the VFO and address information and are disposed to satisfy such requirements that the pits are disposed alternately on both sides of an extension of the center line of one groove, that the pits are disposed alternately on both sides of an extension of the center line of one land, that the pits do not exist on both sides of a position on an extension of the center line of the groove and that the pits do not exist on both sides of a position on an extension of the center line of the land. The method and apparatus include features of irradiating an optical spot onto the said optical recording medium, detecting a reflected beam from the optical recording medium, detecting a VFO signal from the reflected beam indicative of the VFO information, detecting an amplitude of the VFO signal, and controlling an irradiation position of the optical spot on the basis of the amplitude utilizing appropriate apparatus.

4 Claims, 7 Drawing Sheets

U.S. PATENT DOCUMENTS

| | | |
|---|---|---|
| 5,414,652 | 5/1995 | Mieda et al. . |
| 5,444,682 | 8/1995 | Yamada et al. . |
| 5,448,552 | 9/1995 | Onagi . |
| 5,493,552 | 2/1996 | Kobori . |
| 5,499,229 | 3/1996 | Murakami et al. . |

FOREIGN PATENT DOCUMENTS

| | | |
|---|---|---|
| 59-176450 | 10/1984 | (JP) . |
| 36 20 301 A1 | 1/1987 | (JP) . |
| 62-11175 | 3/1987 | (JP) . |
| 62-14705 | 4/1987 | (JP) . |
| 1-34288 | 7/1989 | (JP) . |
| 1-229428 | 9/1989 | (JP) . |
| 3-278336 | 12/1991 | (JP) . |
| 4-72524 | 3/1992 | (JP) . |
| 4-358743 | 12/1992 | (JP) . |
| 6-13859 | 2/1994 | (JP) . |
| 6-60431 | 3/1994 | (JP) . |
| 6-176404 | 4/1994 | (JP) . |
| 6-203411 | 7/1994 | (JP) . |
| 6-243468 | 9/1994 | (JP) . |
| 7-296390 | 11/1995 | (JP) . |
| WO96/25736 | 8/1996 | (JP) . |
| 61-294640 | 11/1997 | (JP) . |
| 62-183037 | 11/1997 | (JP) . |

OPTICAL RECORDING MEDIUM USING LAND/GROOVE RECORDING

CROSS-REFERENCE TO RELATED APPLICATIONS

This is a continuation of U.S. application Ser. No. 09/184,007, U.S. Pat. No. 5,953,310 filed Nov. 2, 1998, which is a continuation of U.S. application Ser. No. 09/059,349, filed Apr. 14, 1998, now U.S. Pat. No. 5,878,008, which is a divisional of U.S. application Ser. No. 08/600,730, filed Feb. 13, 1996, now U.S. Pat. No. 5,805,565, the subject matter of such applications being incorporated by reference herein. This application is also related to U.S. application Ser. No. 09/181,677, filed Oct. 29, 1998, which is a continuation of U.S. application Ser. No. 08/958,867, filed Oct. 27, 1997, which is a continuation of U.S. application Ser. No. 08/733,924, filed Oct. 18, 1996, which is a continuation-in-part of U.S. application Ser. No. 08/600,730, filed Feb. 13, 1996, now U.S. Pat. No. 5,806,565.

BACKGROUND OF THE INVENTION

The present invention relates to optical recording methods and more particularly to a technique based on land/groove recording and suitable for performing high-density optical recording in which the track width is smaller than the optical spot diameter.

A conventional method is disklosed in, for example, JP-A-59-191156. In the prior art, a laser beam generated from a laser diode carried on an optical head is formed into a collimated beam by means of a collimating lens, and the collimated beam passing through a beam splitter is focused by an objective lens so as to be converged into an optical spot on a magneto-optical recording medium. The position of the optical spot on the magneto-optical recording medium is controlled by moving the lens or the optical head by means of an optical spot scanning control means. Reflected light from the magneto-optical recording medium is guided to a photodetector through a beam splitter. A readout signal from the photodetector is processed by a reproduction circuit so as to be converted into reproduced data. Control of overall reproduction is carried out by a controller.

JP-A-6-176404 describes a technique for performing high-density (narrow track) recording.

A recording medium disklosed in JP-A-6-176404 is illustrated, in plan view form, in FIG. 5. Grooves 501 and lands 502 are formed on a substrate, information recording areas are formed in association with both the groove and the land, and prepits 504 are disposed on an extension line 503 of the boundary line between a groove 501 and a land 502. Prepits 504 are positioned each groove on only one side relative to the center line of each groove. With this construction, recording information is recorded on both the groove 501 and the land 502, address information representative of the recording areas are recorded in the form of prepits 504, and one prepit is used in common to a pair of adjacent groove 501 and land 502 to provide address information therefor.

When the technique as above is applied to, for example, a phase change recording medium or a magneto-optical recording medium, interference of information (crosstalk) between adjacent grooves 501 or lands 502 due to the optical interference effect within an optical spot 505 can be prevented, thereby permitting narrowing of track. On the other hand, in the prepit area free from the optical interference effect, the address information can be common to the paired groove and land and the effective track pitch can be increased to reduce crosstalk.

In the example of JP-A-6-176404, however, the disposition of the prepit area is offset on one side of the center line of the groove and an offset tracking error signal is delivered out of the prepit area, with the result that when an optical spot is caused to track a groove or a land, a tracking error (tracking offset) increases, making it difficult to perform high-density recording in which the track pitch is narrowed.

SUMMARY OF THE INVENTION

An object of the present invention is to provide a technique capable of suppressing the tracking offset to a value which is sufficiently low for practical use and permitting efficient disposition of address information even when recording is effected on both the groove and the land.

To accomplish the above object, solutions of the invention are adopted as below.

More particularly, in an optical recording medium having substantially concentric grooves and lands formed on a circular substrate and information recording areas formed in association with both the groove and the land, prepits are disposed on a virtual extension line of the boundary between a groove and a land, the disposition of the prepits satisfying all of the following four conditions:

(i) Prepits are located on both sides of an extension of the center line of one groove;
(ii) Prepits are located on both sides of an extension of the center line of one land;
(iii) Prepits are not located on both sides of any specific position of the center line of one groove; and
(iv) Prepits are not located on both sides of any specific position of the center line of one land.

With this construction, disposition of prepits is not offset on either one side of a virtual extension of the center line of the groove or the land, so that an offset tracking error signal is not delivered out of the prepit area, making the tracking offset hardly occur. Further, since prepits do not exist on both sides of or symmetrically to a position on an extension of the center line of the groove or the land, interference of prepit information between adjacent tracks do not take place within a reproduction spot. Accordingly, recording can be performed on both the groove and the land and addresses can be reproduced without crosstalk to permit high-density narrow track recording.

Preferably, prepits are disposed alternately at a period which is even times a channel bit length on both sides of a virtual extension of the center line of the groove.

Thus, the prepits are uniformly disposed on both sides of a virtual extension of the center line of the groove or the land, making the tracking offset more hardly occur.

Further, the groove and the prepit have the same depth which is 70 nm or less. More preferably, the depth is 40 nm or more and 60 nm or less.

Through this, crosstalk between the groove and the land can duly be canceled and an excellent tracking servo signal can be obtained, thus making injection and production of a medium easy. With the groove depth being in excess of 70 nm, injection of the groove is difficult to achieve. With the groove depth being about 50 nm, tracking servo is maximized and substantially the same effect can be obtained at a groove depth which is 10 nm around 50 nm.

Preferably, the groove and the land have substantially the same width which is in the range of from 0.3 $\mu$m to 0.75 $\mu$m.

Through this, excellent tracking can be compatible with high-density recording. If the groove and the land has a width which is not greater than 0.3 $\mu$m, two sets of groove and land are concurrently within a single optical spot and any excellent tracking signal cannot be obtained. With the width of the groove and the land being in excess of 0.75 μm, practical high-density recording cannot be permitted.

The minimal diameter of a prepit is made to be smaller than the width of each of the groove and land. More preferably, the diameter falls within the range of from 0.25 μm to 0.55 μm.

Through this, an excellent prepit signal can be obtained without crosstalk. If the diameter is not greater than 0.25 μm, power of the prepit signal decreases extremely and with the diameter being in excess of 0.55 μm, crosstalk takes place.

When an optical recording medium is used in which grooves and lands are formed on a substrate, information recording areas are formed in association with both the groove and the land, any groove is not formed but flat address areas are discretely formed in the information recording area, and first and second address its are disposed in the address area on an extension of the boundary between the groove and the land, the first and second address pits being disposed to satisfy such requirements that the first and second address pits are disposed alternately on both sides of an extension of the center line of one groove, that the first and second address pits are disposed alternately on both sides of an extension of the center line of one land, that address pits do not exist on both sides of a position on an extension of the center line of the groove and that address pits do not exist on both sides of a position on an extension of the center line of the land, an optical spot is irradiated on the optical recording medium, a reflected beam from the optical recording medium is detected, an address pit is detected from the detected reflected beam to form an address pit readout signal, an address is detected on the basis of the address pit readout signal, an amplitude of a first readout signal obtained from the first address pit of the address pit readout signal is sampled and held, an amplitude of a second readout signal obtained from the second address pit of the address pit readout signal is sampled and held, the amplitudes of the first and second readout signals are compared together, an offset signal is formed on the basis of a result of comparison, and the irradiation position of the optical spot is controlled on the basis of the offset signal.

Through this, the tracking offset can be suppressed sufficiently for practical use and address information can be obtained.

When tracking is carried out by sequentially obtaining tracking servo signals through the use of a diffracted beam obtained from a groove and correcting an offset of a tracking servo signal with an offset signal, stabler tracking can be ensured. More particularly, upon detection of a reflected beam from the optical recording medium, a tracking servo signal is formed by detecting a light beam diffracted by a groove by means of a plurality of photodetectors, comparing diffracted beams detected by the plurality of photodetectors and detecting the relative positional relation between the groove and the optical spot, the tracking servo signal is corrected with an offset signal, and the irradiation position of the optical spot is controlled on the basis of the corrected tracking servo signal.

Further, an optical recording/reproducing apparatus may be constructed which uses a similar optical recording medium, comprises a light beam source, a beam focusing means for focusing and irradiating a light beam generated by the light beam source on the optical recording medium, photodetecter detecting a reflected beam of the light beam irradiated by the beam focusing means, a reproduction circuit reproducing information by using a signal from the photodetector, and a scanner moving the position of an optical spot irradiated by the beam focusing means to a desired position on the optical recording medium, and further comprises means for detecting an address on the basis of a readout signal from a prepit, a low-pass filter for detecting an amplitude of a low frequency component of the readout signal from the prepit, and a circuit performing lock-in detection of a passed signal of the low-pass filter, whereby the position of the optical spot is controlled on the basis of the detected signal.

With this construction, the tracking offset can be suppressed to a smaller value.

According to an aspect of the present invention, as shown in for example FIG. 1, prepits are disposed on both sides of a virtual extension of the center line of the groove or the land in staggered relation. Accordingly, offset can be decreased to make the tracking offset hardly occur and prepits do not exist on both sides of a position on the extension of the center line of the groove or the land, with the result that interference of prepit information between adjacent tracks can be prevented within a reproduction spot and high-density narrow track recording can be ensured.

Further, even if a tracking offset takes place as shown in FIG. 3, signal amplitudes of prepits on both sides are compared to perform accurate detection of the tracking offset amount. Accordingly, by feedback-controlling the information to the scanner, the tracking offset can be suppressed.

DESCRIPTION OF THE PREFERRED EMBODIMENTS

Figure 1:
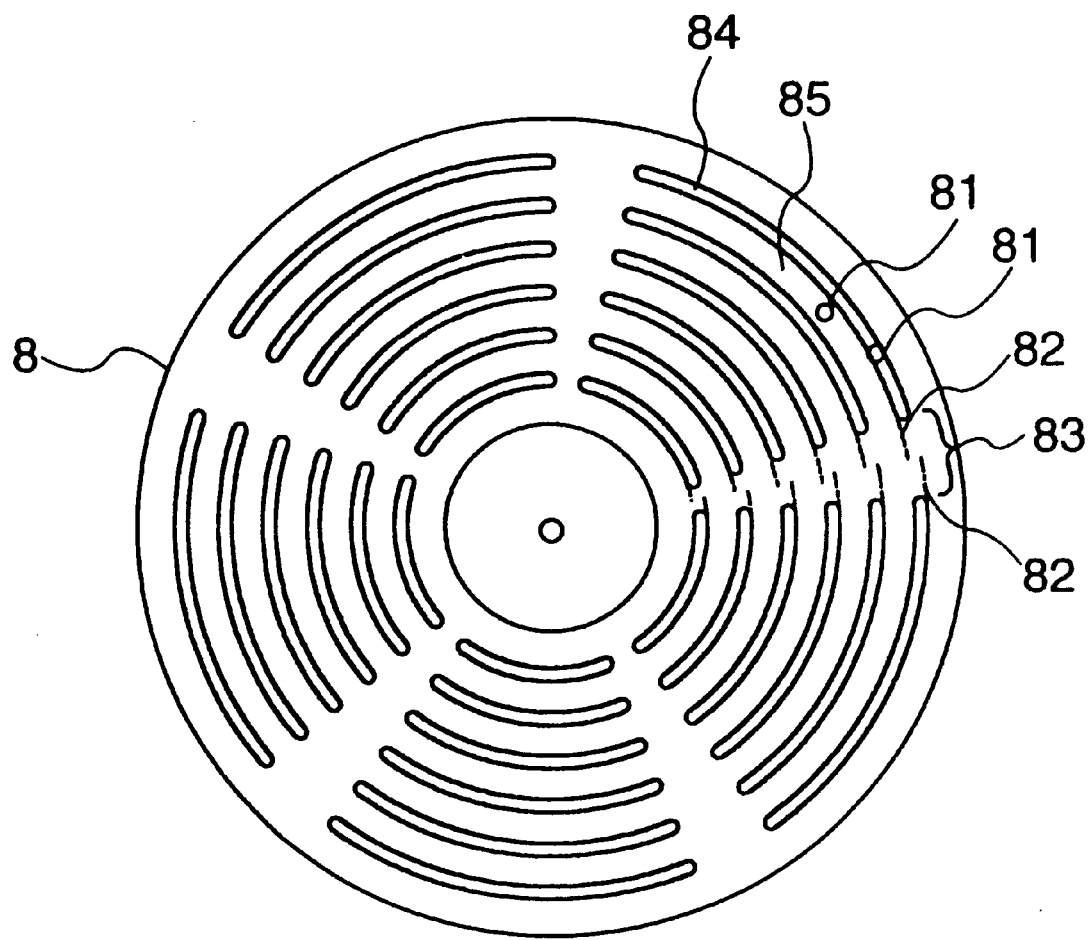
FIG. 1 is a plan view of an embodiment of an optical recording medium according to the present invention.

Referring now to FIG. 1, there is illustrated, in plan view form, an optical recording medium of the present invention. Grooves 84 each having a width of 0.6 μm and a depth of 50 nm and lands 85 each having a width of 0.6 μm are formed alternately in the radial direction of the medium and recording marks 81 are recorded on the two kinds of areas. More particularly, the land 85 and the groove 84 are both recording areas which form tracks. In a prepit area 83, any groove is not formed but prepits 82 are disposed on a flat area serving as an address area. This type of optical recording medium can be produced by forming a recording film on a disk-like substrate having grooves 84 and prepits 82, which substrate being prepared through mass producing using a stamper. The prepit area 83 is formed radially of the substrate, having indicia such as marks in the form of prepits 82 which are disposed concentrically across a plurality of tracks. The prepits are not always required to be arranged in the radial direction over the entire radius of the substrate and the prepit area may be divided into a plurality of zones which are arranged in the radial direction, forming a ZCAV (zoned constant angular velocity) or ZCLV (zoned constant linear velocity) type format which is preferable from the standpoint of high-density recording.

Figure 2:
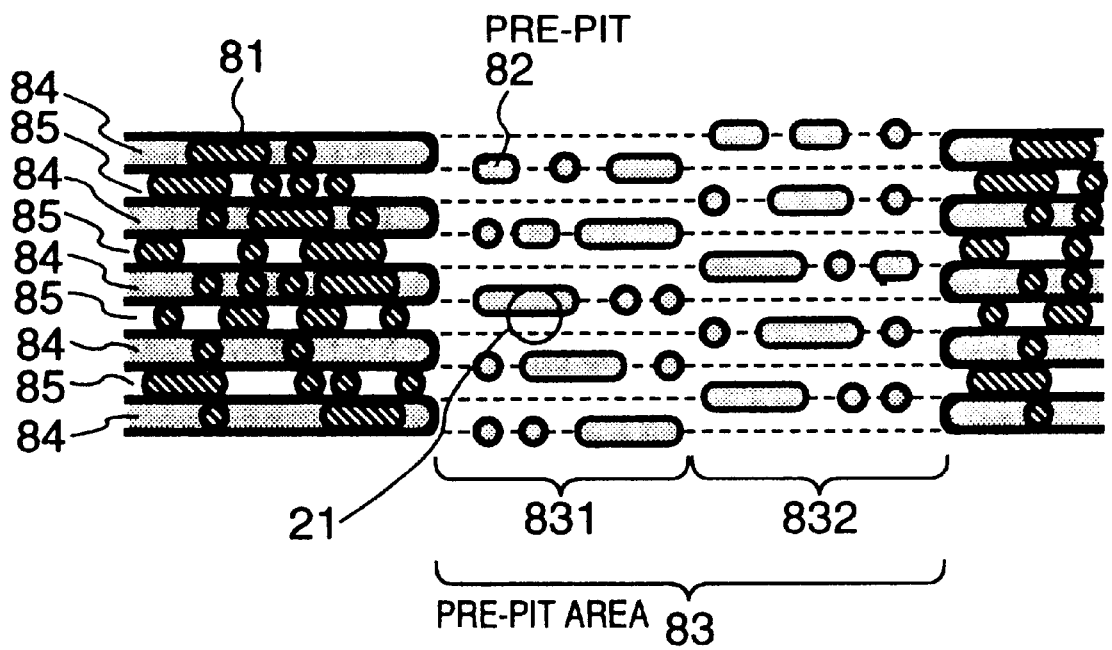
FIG. 2 is a fragmentary plan view of the FIG. 1 optical recording medium.

Referring to FIG. 2, the neighborhood of the prepit area 83 is illustrated in an enlarged view form. Pits 82 are disposed on an extension line of the boundary between a land and a groove. A pit has a width of 0.35 $\mu$m and a depth of 50 nm. The prepit area is divided into a first prepit area 831 and a second prepit area 832. In the first prepit area 831, pits 82 are disposed on the upper side, in the drawing, of the center line of a land 85 but in the second prepit area 832, pits 82 are disposed on the lower side, in the drawing, of the center line of the land 85. Accordingly, when an optical spot 21 scans, for example, the land 85, a signal is always produced from either one of the first and second prepit areas and consequently, there is no fear that crosstalk will occur between adjacent tracks. Therefore, address information recorded in the form of prepits can duly be reproduced without crosstalk.

Since pits 82 are not adjoined in the radius direction, injection can be facilitated upon formation by the stamper.

Also, pits 82 are uniformly disposed on both sides of a track (a land or a groove) and hence the influence of a tracking error signal, which is delivered out of the prepit area while being offset due to pits 82, upon a tracking servo signal can be canceled. Accordingly, the tracking offset can be suppressed to a minimum.

Further, when reproducing, for example, a land 85, reproduction of address information at the second prepit area 832 is carried out continuously with reproduction of address information at the first prepit area 831. Accordingly, when the two areas are united into one area in which information is arranged to provide address information for one track, an address (track number) of a land and that of a groove can be set independently of each other.

In the present embodiment, a magneto-optical recording film (TbFeCo) is used as the recording film. Accordingly, the recording mark is prepared in the form of a recorded domain. A known phase change film may also be used as the recording film. In the example of FIG. 2, one set of first and second prepit areas is provided but a plurality of sets may be provided as necessary.

Figure 6:
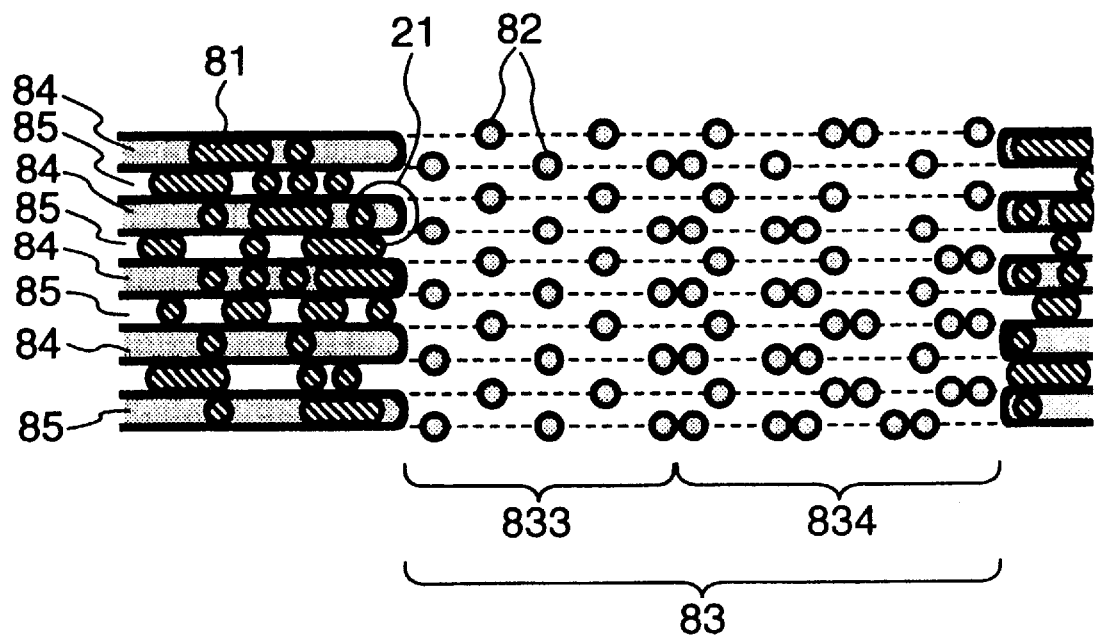
FIG. 6 is a fragmentary plan view of another embodiment of the optical recording medium according to the present invention.

Referring to FIG. 6, there is illustrated, in enlarged fragmentary plan view form, another example of the optical recording medium of the present invention. Grooves 84 each having a width of 0.5 $\mu$m and a depth of 40 nm and lands 85 each having a width of 0.5 $\mu$m are formed alternately and recording marks 81 are recorded on the two kinds of areas. Thus, the land 85 and the groove 84 are both recording areas. In a prepit area 83, any groove is not formed but substantially circular pits 82 (each having a diameter of 0.3 $\mu$m and a depth of 40 nm) are disposed on an extension line of the boundary between a land and a groove. The prepit area is divided into a VFO (Variable Frequency Oscillator) area 833 and an address area 834.

Especially, in the VFO area, pits 82 are disposed alternately on the upper and lower sides of the center line of a land 85. In the address area, pits 82 are disposed alternately at the same period as that in the VFO area. Accordingly, there are no pits which exist on both sides of (or symmetrically to) a position on the center line of the land and the groove. In addition, in the address area, data for a particular track is so encoded as to differ by one pit from data for an adjacent track. In other words, the data takes the form of a Gray code. With this construction, when an optical spot 21 scans, for example, a land 85, pits on either one side are always reproduced and there is no fear that crosstalk will occur between adjacent tacks. Therefore, address information distributed to the prepits can duly be reproduced without crosstalk. Since pits 82 for adjacent tracks do not adjoin to each other, injection can be facilitated. Also, pits 82 are uniformly disposed on both sides of a track (a land or a groove) and hence the influence of a tracking error signal, which is delivered out of the prepit area while being offset due to pits 82, upon a tracking servo signal can be canceled. Accordingly, the tracking offset can be suppressed to a minimum.

Figure 7:
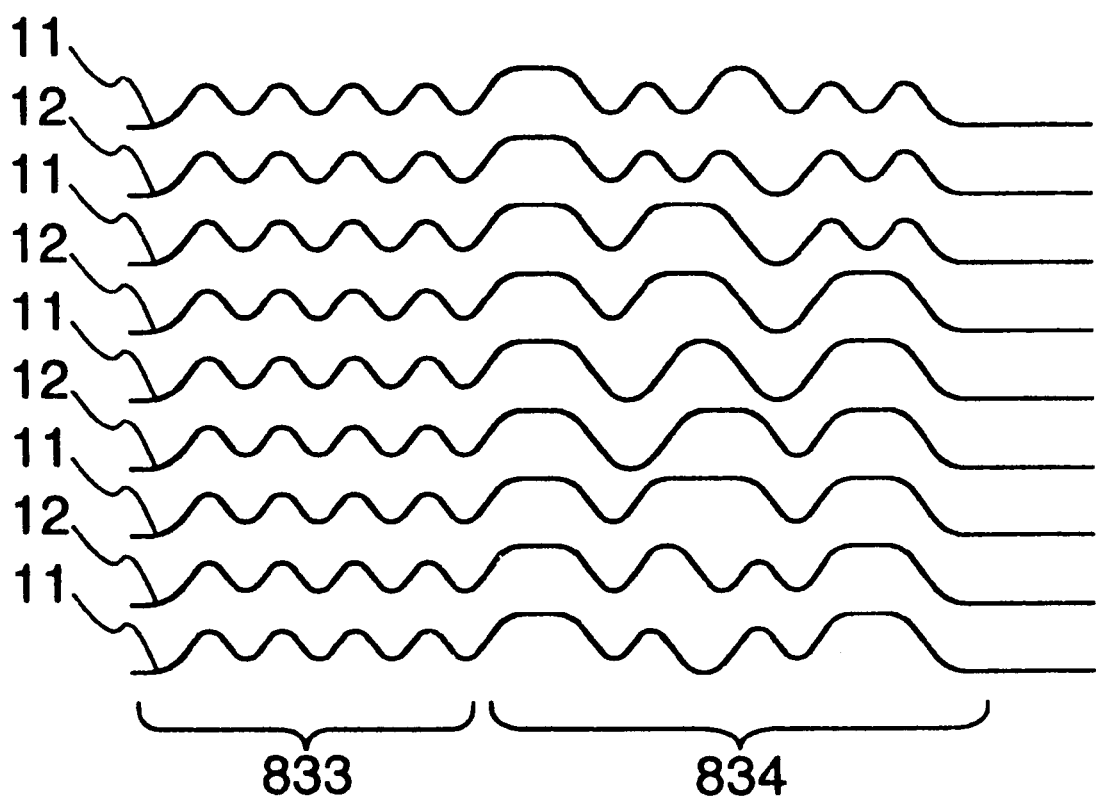
FIG. 7 is a waveform diagram showing readout waveforms obtained from the FIG. 6 optical recording medium.

Referring to FIG. 7, readout signals obtained from the prepit area 83 in the FIG. 6 embodiment are illustrated. When an optical spot scans the center of individual tracks, signal waveforms shown in the Figure are generated of which signals 11 are generated from tracks constructed of lands 85 and signals 12 are generated from tracks constructed of grooves 84. As is clear from the Figure, the generated signals are different for the individual tracks, demonstrating that address information is recorded very efficiently. By virtue of the use of the Gray code, an address can be reproduced in the course of inter-track access, ensuring suitability to high-speed access. Further, the use of the Gray code makes an error hardly occur even in the presence of crosstalk, thus ensuring suitability to narrowing of tracks.

Figure 4:
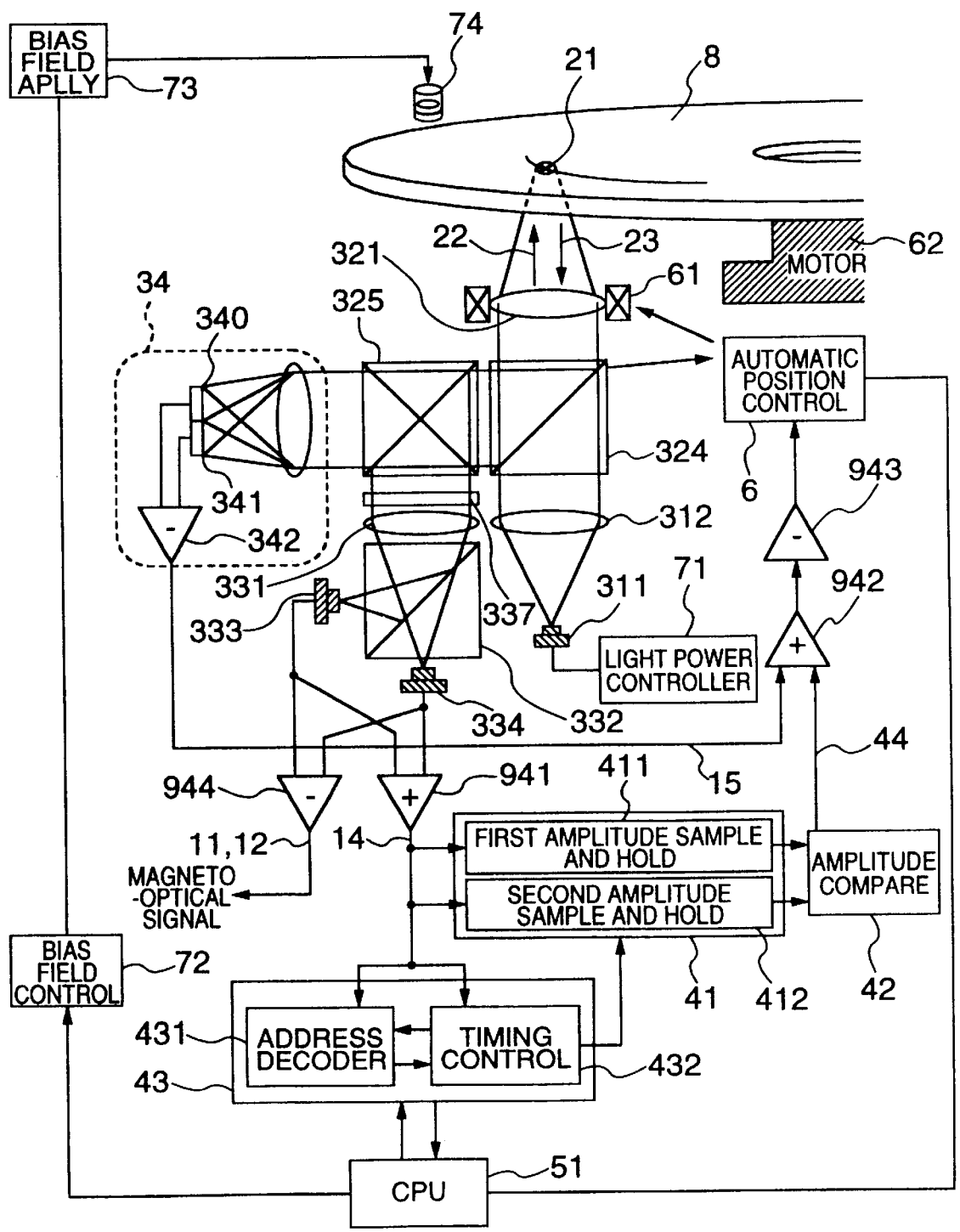
FIG. 4 is a block diagram of an embodiment of an optical recording/reproducing apparatus according to the present invention.
Figure 5:
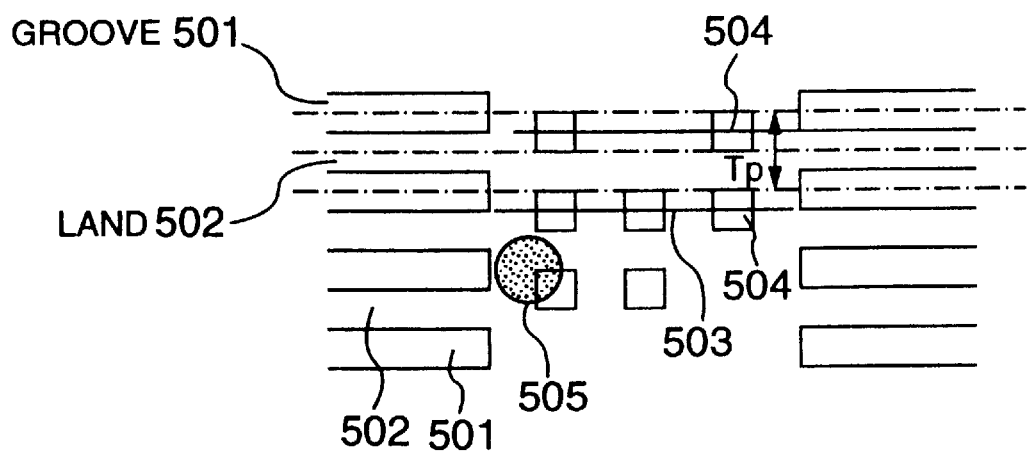
FIG. 5 is a fragmentary plan view of a prior-art optical recording medium.

Referring now to FIG. 4, there is illustrated an example of construction of an optical recording/reproducing apparatus of the present invention.

In the present embodiment, a laser diode 311 having a wavelength of 680 nm is used as a light source, a laser beam is formed into a collimated beam by means of a collimating lens 312, and the laser beam is focused to an optical spot 21 on an optical disk 8 by means of an objective lens 321. As necessary, a beam shaping means such as a prism and other lenses may be provided in the optical path. The optical disk shown in FIGS. 1 and 2 is used as the optical disk 8.

Power of the laser diode 311 is controlled by a light power controller 71 having the auto-power control function. Beam splitters 324 and 325 are adapted to guide a light beam 23 reflected from the optical disk 8 to photodetectors 333, 334, 340 and 341. In the present embodiment, the aperture ratio of the objective lens 321 is set to 0.55. Consequently, the diameter of the optical spot 21 on the optical disk 8 is 1.1 $\mu$m.

The optical disk 8 is rotated by a motor 62. The optical spot 21 can be moved to a desired position on the optical disk 8 by means of a scanning mechanism. In the present embodiment, the scanning mechanism, as designated at 6, has an automatic position controller 6 also designated at 6 and having functions of auto-focus control and automatic tracking, and a lens actuator 61 controlled by the automatic position controller 6.

The reflected beam 23 from the optical disk is guided to a signal detection system by means of the beam splitters 324 and 325. Part of the reflected beam is split to two beams having different polarization planes through a half-wave plate 337, a lens 331 and a polarized beam splitter 332 and the two beams are detected by the photodetectors 333 and 334, respectively. Readout signals from the two detectors 333 and 334 are differentially amplified by a differential amplifier 944 so that information magnetically recorded on the optical disk may be detected magneto-optically. The readout signals of the two detectors 333 and 334 are also added together by means of an adder 941 so that information 14 recorded in the form of prepits on the optical disk may be detected.

The automatic position controller 6 utilizes the reflected beam 23 from the optical disk 8 to cause a tracking servo signal detector 34 to detect an optical spot position which is used for feedback control. For detection of the optical spot position, the detectors 340 and 341 detect power of a diffracted light ray from a groove in the optical disk 8 and signals delivered out of the detectors 340 and 341 are differentially amplified by a differential amplifier 342 to produce a difference signal.

Figure 3:
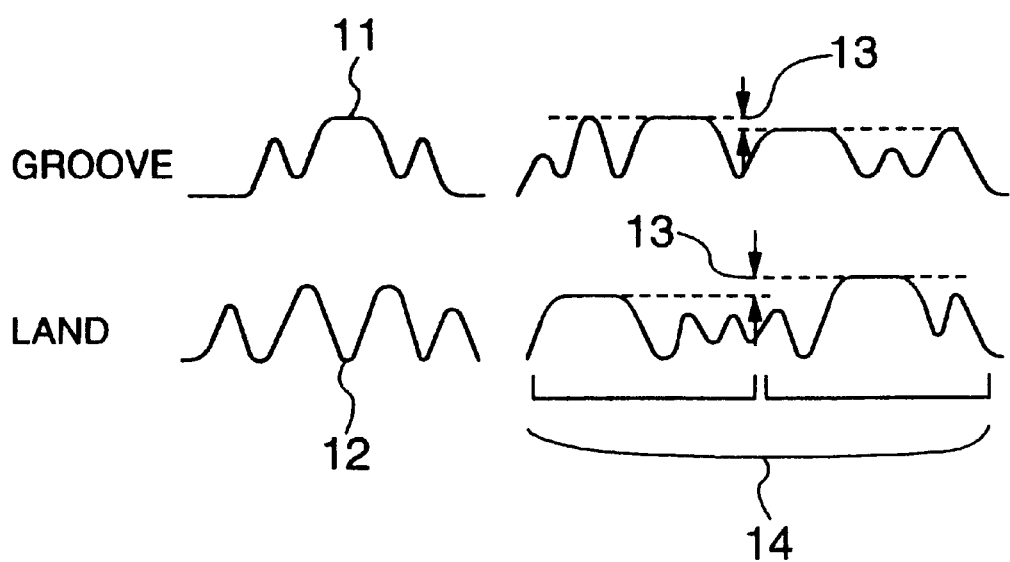
FIG. 3 is a waveform diagram showing readout waveforms in the present invention.

Illustrated in FIG. 3 are signals obtained from the optical disk 8 shown in FIGS. 1 and 2 in the present embodiment. When the optical spot 21 scans a land 85, a signal wave including magneto-electrical reproduced signal 12 shown in under side of FIG. 3 is obtained. As shown in FIG. 3, when the optical spot 21 deviates from the track center (being offset), an amplitude difference 13 takes place between prepit signal portions from the first and second prepit areas 831 and 832. This amplitude difference 13 corresponds to an amount of tracking offset.

The prepit signal 14 shown in FIG. 3 is fed to an address detection means 43 so as to be decoded to address information by an address decoder 431. At the same time, timings for signals of the first and second prepit areas are generated by a timing controller 432.

On the basis of the timing information, a first amplitude sample and hold circuit 411 stores an amplitude (average maximum amplitude) of the first prepit area and a second amplitude sample and hold circuit 412 stores an amplitude (average maximum amplitude) of the second prepit area. Alternatively, the first and second amplitude sample and hold circuits 411 and 412 may have a common amplitude sampler.

The thus held amplitudes are compared together by means of an amplitude comparator 42 to produce an amplitude difference 13. On the basis of the amplitude difference 13, a tracking offset signal 44 is formed. The tracking offset signal 44 is added with a tracking error signal 15 from the servo signal detector 34 by means of an adder 942 to produce a sum signal which in turn is fed back to the position moving means (scanning means) 6.

In the apparatus of the present embodiment, the tracking offset signal is formed on the basis of the amplitude difference 13 and the tracking error signal is corrected with the tracking offset signal to produce a corrected signal which is fed back to the position moving means. Accordingly, even when various kinds of external disturbance such as aberration of the optical spot is taken into consideration, the tracking offset can be decreased to ±0.03 $\mu$m or less. Under the nominal state devoid of optical aberration, the tracking offset is ±0.015 $\mu$m or less.

In carrying out recording with the apparatus of the present embodiment, a recording beam 22 whose power is controlled by the light power controller 71 is irradiated on the optical disk 8 to form an optical spot 21. While applying a bias field to the neighborhood of the optical spot 21 by means of a bias field power controller 72, a bias field application circuit 73 and a bias coil 74, the temperature of the recording film is heated by the optical spot 21 to a value near the Curie temperature to form a recorded domain in a heated area. In this example, the size of the recorded domain is assumed to be of a width of about 0.5 $\mu$m.

Figure 8:
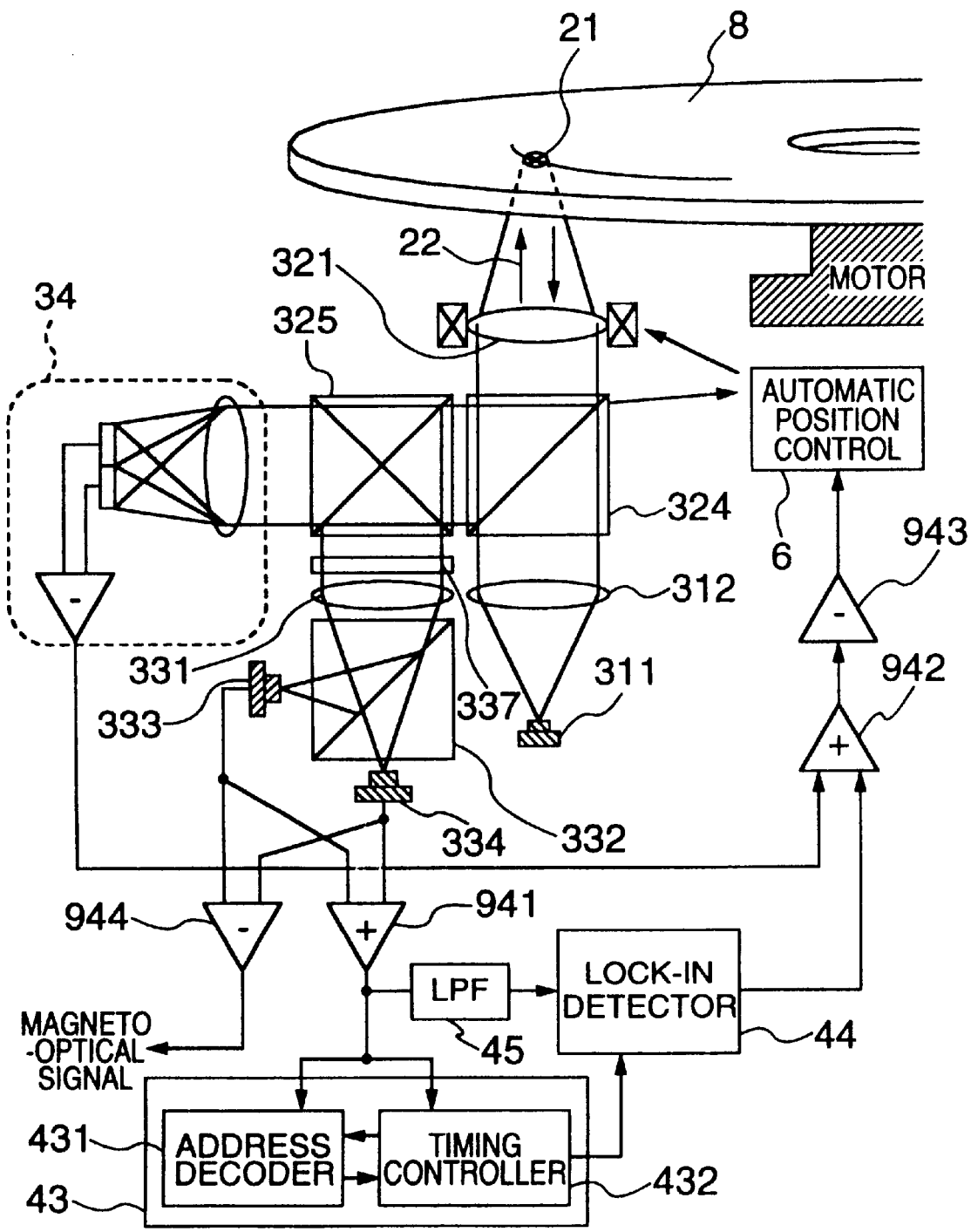
FIG. 8 is a block diagram of an embodiment of an optical recording apparatus according to the present invention.

Referring to FIG. 8, there is illustrated another example of construction of the optical recording/reproducing apparatus of the present invention. This example differs from the FIG. 4 embodiment in that the prepit signal is passed through a low-pass filter 45 and lock-in amplified by a lock-in amplifier (detector) 44, thereby forming tracking error information. In this example, the optical recording medium of FIG. 6 is used and therefore, pits 82 are disposed alternately on both sides of the center of a land 85 or a groove 84 in the VFO area 833.

Figure 9:
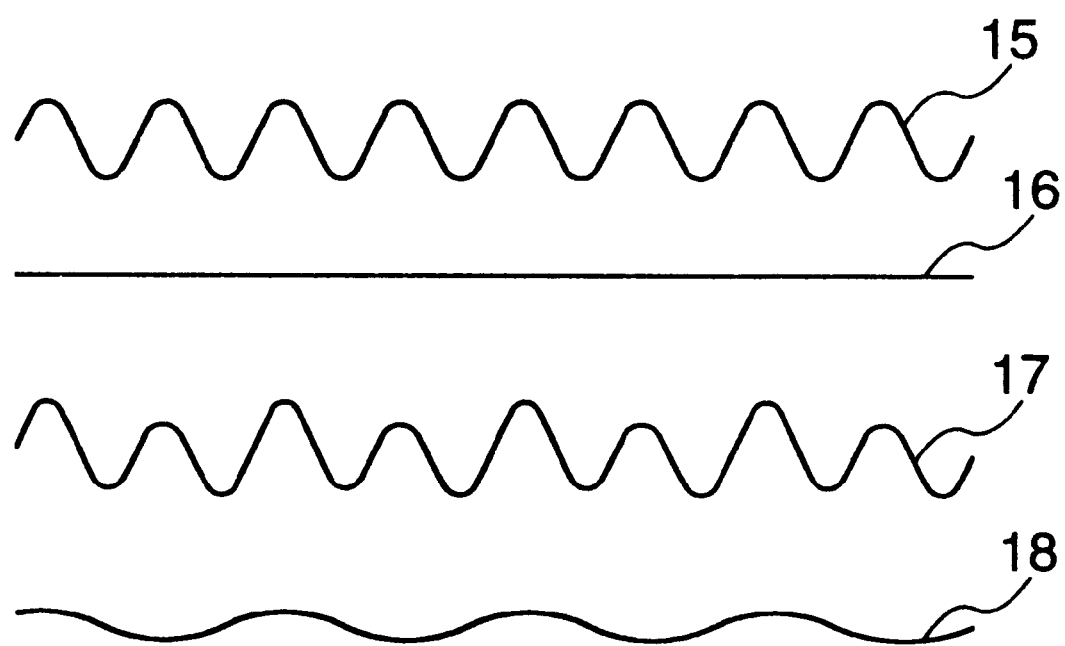
FIG. 9 is a waveform diagram useful to explain the principle of the optical recording apparatus of the present invention.

Illustrated in FIG. 9 are waveforms of a VFO signal (output of the amplifier 941) and a low-pass filter signal (output of the LPF 45). In the absence of an offset, a low-pass filter component 16 of a VFO signal 15 has no amplitude but in the presence of a tracking offset, a low-pass filter component 18 of a VFO signal 17 has an amplitude. This amplitude is lock-in amplified by the lock-in amplifier 44 to detect a tracking offset. Accordingly, by feedback-controlling the offset amount to the scanning means 6, the tracking offset can be decreased. In the present embodiment, the tracking offset can be suppressed to ±0.025 $\mu$m or less.

The present invention is in no way limited to the foregoing embodiments. For example, an optical head capable of generating a plurality of optical spots at a time may also be used. In addition to the magneto-optical recording medium, a phase change recording medium may be used. Further, in addition to the method using the diffracted beam, a three-spot detection method in which power levels of reflected beams from a plurality of optical spots are compared together or a pre-wobbling method may be used as the servo signal detection method.

By using the optical recording medium of the present invention, the tracking offset can be suppressed to a level which is sufficiently small for practical use (0.03 $\mu$m or less) and address information can be obtained easily even during high-density narrow track recording.

By using the optical recording/reproducing apparatus of the present invention, the tracking offset can be decreased easily through feedback control.

What is claimed is:

1. An optical recording/reproducing apparatus for use with an optical recording medium to which grooves and lands are formed on a substrate, information recording areas are formed in association with both a groove and a land, prepits are disposed on a virtual extension of the boundary between said groove and said land, said prepits being disposed to satisfy such requirements that said prepits are disposed alternately on both sides of a virtual extension of the center line of said groove, that said prepits are disposed alternately on both sides of a virtual extension of the center line of said land, that said prepits do not exist on both sides of a position on the center line of said groove, and that said prepits do not exist on both sides of a position on the center line of said land, said prepits represent address information and VFO information, said optical recording/reproducing apparatus comprising:

light beam generation means;

beam focusing means for focusing and irradiating a light beam generated by said light beam generation means on said optical recording medium;

reproduction means for reproducing information by using a read out signal from a photodetection means detecting a reflected light beam from said optical recording medium;

an amplifier for amplifying said read out signal;

means for detecting a VFO signal amplitude of the read out signal from said VFO information; and scanning means for moving a position of an optical spot irradiated by said beam focusing means to a desired position on said optional recording medium on the basis of said VFO signal amplitude.

2. An optical recording/reproducing apparatus according to claim 1, further comprising means for detecting an address on the basis of a read out signal from said prepits representing said address information.

3. An optical recording/reproducing method for use with an optical recording medium to which grooves and lands are formed on a substrate, information recording areas are formed in association with both a groove and a land, an address area formed at said information recording area preceding the groove and the land, VFO and address information represented by pits are disposed on an extension of the boundary between said groove and said land, said pits representing said VFO and address information being disposed to satisfy such requirements that said pits are disposed alternately on both sides of an extension of the center line of one groove, that said pits are disposed alternately on both sides of an extension of the center line of one land, that said pits do not exist on both sides of a position on an extension of the center line of the groove and that said pits do not exist on both sides of a position on an extension of the center line of the land, said method comprising the steps of:

irradiating an optical spot onto said optical recording medium;

detecting a reflected beam from said optical recording medium;

detecting a VFO signal from the reflected beam indicative of said VFO information;

detecting an amplitude of said VFO signal; and controlling an irradiation position of the optical spot on the basis of the amplitude.

4. An optical recording/reproducing method according to claim 3, further comprising the steps of upon detection of the reflected beam from said optical recording medium, forming a tracking servo signal by detecting a light beam diffracted by the groove utilizing a plurality of photodetectors, detecting a relative positional relation between the groove and the optical spot, correcting the tracking servo signal with an offset signal associated with the amplitude of said VFO signal, and controlling the irradiation position of said optical spot on the basis of the corrected tracking servo signal.

* * * * *